United States Patent [19]

Fieldhouse et al.

[11] 4,327,063

[45] Apr. 27, 1982

[54] METHOD OF PURIFYING CYCLIC DICHLOROPHOSPHAZENES CONTAINING TRACE AMOUNTS OF PROTIC IMPURITIES

[75] Inventors: John W. Fieldhouse, Mogadore; Daniel F. Graves, Clinton, both of Ohio

[73] Assignee: The Firestone Tire & Rubber Company, Akron, Ohio

[21] Appl. No.: 181,028

[22] Filed: Aug. 25, 1980

[51] Int. Cl.$^3$ ............................................. C01B 25/10
[52] U.S. Cl. ................................................. 423/300
[58] Field of Search ......................................... 423/300

[56] References Cited

U.S. PATENT DOCUMENTS 4,116,891 9/1978 Dieck et al. .................... 423/300
4,123,503 10/1978 Snyder et al. .................. 423/300

Primary Examiner—O. H. Vertiz
Assistant Examiner—Wayne A. Langel

[57] ABSTRACT

Cyclic dichlorophosphazenes containing trace amounts of protic impurities such as water are purified by treatment with boron trihalides under specified temperature and pressure conditions. The catalytic polymerization of the resultant cyclic dichlorophosphazenes, which are substantially free of protic impurities, is greatly improved.

17 Claims, No Drawings

METHOD OF PURIFYING CYCLIC DICHLOROPHOSPHAZENES CONTAINING TRACE AMOUNTS OF PROTIC IMPURITIES

BACKGROUND OF THE INVENTION

This invention relates to a method of purifying cyclic dichlorophosphazenes containing trace amounts of protic impurities. More particularly, the invention relates to a method of purifying cyclic dichlorophosphazenes containing protic impurities by treatment with boron trihalides under specified temperature and pressure conditions (described hereinafter).

Chlorophosphazenes of the formula $(NPCl_2)_n$, wherein n is 3 to 9, are conventionally prepared by the reaction of phosphorus pentachloride and ammonium chloride. Chlorophosphazenes prepared by the above reaction are in fact a mixture of compounds consisting of cyclic dichlorophosphazene oligomers such as the cyclic trimer $(NPCl_2)_3$ and tetramer $(NPCl_2)_4$, low molecular weight oily linear oligomers and certain other unspecified impurities. Of these compounds, the cyclic trimer is the preferred compound for use as the polymerizable monomer in the preparation of high molecular weight linear polydichlorophosphazene polymers, although mixtures containing the cyclic trimer and minor amounts of tetramer are also suitable.

The general approach of prior art methods of purifying the chlorophosphazenes produced by the reaction of phosphorus pentachloride and ammonium chloride has involved the separation of the cyclic oligomers from the linear oligomers and other impurities either by the utilization of the differences in the boiling points of these compounds or by the different reactivities of these compounds with aqueous bases. Specific purification methods have involved the extraction of chlorophosphazene from petroleum ether solutions with sulfuric acid, U.S. Pat. No. 3,008,799; controlled crystallization in a variety of solvents, U.S. Pat. No. 3,378,353; separation of the trimer and tetramer from the produced mixtures through distillation involving a spinning band column, U.S. Pat. No. 3,379,510; contacting molten chlorophosphazenes with an inert solvent vapor so as to selectively vaporize the cyclic trimer, separating a solvent vapor phase laden with trimer and some tetramer from the molten residue, condensing it to form a solution of trimer and tetramer in the solvent and subsequently recovering trimer together with some tetramer from the solution, U.S. Pat. No. 3,677,720 steam distillation of chlorophosphazenes resulting in hydrolysis of x=4-9 and hence separation of the trimer. Chemical Abstracts, Volume 77, Page 540, 159648D (1972); saponification and hydrolysis of chlorophosphazenes by treatment with aqueous sodium or ammonium hydroxide resulting in unreacted trimer and tetramer, U.S. Pat. No. 3,694,171; contacting a crude chlorophosphazene with a Bronsted base, removing water formed from the reaction of the Bronsted base with the impurities in the chlorophosphazene, and then recovering at least a very high purity cyclic chlorophosphazene trimer, U.S. Pat. No. 3,952,086; and treating the crude chlorophosphazene by first subjecting it to at least two water-washings and then further purifying it by a conventional purification procedure such as recrystallization, sublimation, distillation or melt-filtering, U.S. Pat. No. 4,175,113.

The aforementioned prior art approaches to the purification of chlorophosphazenes in many instances result in the effective separation of the cyclic oligomers from the linear oligomers and other nonprotic impurities. However, none of these prior art purification methods are effective enough to remove trace amounts of protic impurities which are present in cyclic oligomers.

We have found that the presence of trace amounts of protic impurities in cyclic dichlorophosphazene oligomers, e.g., $(NPCl_2)_3$, $(NPCl_2)_4$, employed as the starting materials for the preparation of high molecular weight polydichlorophosphazene polymers inhibits the polymerization of such oligomers. Accordingly, a process for removing protic impurities from such cyclic oligomers would be highly desirable.

We have now discovered an effective and simple process for removing protic impurities from cyclic dichlorophosphazene oligomers. The method involves the treatment of the oligomer with boron trihalides under appropriate conditions (described below) prior to the polymerization procedure.

Boron trihalides have previously been employed as catalysts in the polymerization of cyclic dichlorophosphazene oligomers as illustrated by U.S. Pat. Nos. 4,116,891 and 4,123,503. However, insofar as applicants are aware, such compounds have not been employed to pretreat the oligomer prior to polymerization in order to remove protic impurities as is the case in the present invention.

SUMMARY OF THE INVENTION

In accordance with the present invention, a process for removing trace amounts of protic impurities from cyclic dichlorophosphazenes represented by the formula $(NPCl_2)_n$, wherein n is from 3 to 9, has been developed. The process involves first heating the cyclic dichlorophosphazene in a reactor to a temperature of from about 115° to 150° C. Then, a gaseous or liquid boron trihalide is added to the reactor in an amount in excess of the amount of protic impurities present in the cyclic dichlorophosphazene while maintaining the temperature of the reactor below 150° C. Following this step, the reactor is pressurized with an inert gas to an internal pressure which is sufficient to permit intimate contact between the cyclic dichlorophosphazene and the boron trihalide. Then, the contents of the reactor are agitated for a sufficient period of time to permit the reaction of substantially all of the protic impurities in the cyclic dichlorophosphazene with the boron trihalide. The reactor is then purged with inert gas to remove the products formed from the reaction of protic impurities and boron trihalide as well as the excess boron trihalide, thereby producing a cyclic dichlorophosphazene which is substantially free of protic impurities.

Cyclic dichlorophosphazenes purified by the process of the invention when subjected to catalytic polymerization procedures show increased polymerization rates, higher percentage conversions and more controllable molecular weight of the resultant linear polydichlorophosphazene polymer.

DETAILED DESCRIPTION OF THE INVENTION

As indicated, the invention relates to a method of removing trace amounts of protic impurities from cyclic dichlorophosphazene oligomers by treating such oligomers with boron trihalides. The phrase "protic impurities" as employed throughout the specification and claims refers to materials which are capable of acting as proton donors. Thus, the term "protic" as employed herein is in essence the antonym of the term "aprotic." Protic impurities which may be present in trace amounts in the cyclic dichlorophosphazene oligomers, include water, methanol, ethanol, isopropanol, alkyl amines and other basis materials. Of these materials, water is the most common and deleterious impurity present in the cyclic dichlorophosphazene.

The phrase "trace amounts" as applied to the protic impurities herein refers to amounts of impurities on the order of parts per million (hereinafter PPM). Thus, the cyclic dichlorophosphazenes which are purified by the process of the invention may contain from 10 to 1000 PPM of such protic impurities.

Cyclic dichlorophosphazenes which are purified by the process of the invention are cyclic oligomers represented by the formula $(NPCl_2)_n$ in which n is an integer of from 3 to 9. A preferred cyclic oligomer for use in the process is the cyclic trimer $(NPCl_2)_3$.

The cyclic dichlorophosphazene oligomer containing protic impurities is heated in a suitable reactor to a temperature of from 115° C. to 150° C. The lower end of the temperature range represents a temperature above the melting point of the oligomer while the upper end of the temperature range represents a temperature below that required to initiate polymerization.

The boron trihalide which is employed to treat the cyclic dichlorophosphazene in order to remove the protic impurities may be represented by the general formula $BX_3$ wherein X is fluorine, chlorine, bromine or iodine. A preferred boron trihalide for such purpose is $BCl_3$.

The boron trihalide employed in the process can be either in the form of a gas or a liquid with the gaseous boron trihalide being preferred.

The amount of boron trihalide utilized in treating the cyclic dichlorophosphazene oligomer to remove trace amounts of protic impurities can be varied somewhat and basically depends upon the amount of protic impurities present in the oligomer. The amount of protic impurities present in these oligomers varies somewhat from lot to lot. Accordingly, the amount of boron trihalide to be used in the pretreatment is from a practical standpoint based upon the amount of water found in the oligomers. This can readily be determined by Karl Fischer water analysis. Once the amount of water is so determined, an excess of boron trihalide, usually on the order of from about 1.1 to about 8.0 times the millimolar quantity of water, is employed in order to assure that all of the protic impurities are removed. Thus, the amount of boron trihalide employed is in excess of the total amount of protic impurities present in the cyclic dichlorophosphazene oligomer.

As indicated above, following the addition of boron trihalide to the reactor, the reactor is pressurized with an inert gas to an internal pressure which is sufficient to permit intimate contact between the cyclic dichlorophosphazene oligomer and the boron trihalide.

The inert gas employed may be any gas which is unreactive with the cyclic oligomer. A preferred gas for such use in nitrogen.

The internal pressure of the reactor is maintained so as to provide intimate contact between the boron trihalide and the cyclic trimer. Thus, the internal pressure may be varied from about 50 psig to about 300 psig. However, it is usually preferred to utilize an internal pressure of 50 psig.

In treating the cyclic dichlorophosphazene oligomer with boron trihalide under pressure, the materials are agitated for a sufficient period of time to permit the reaction of substantially all of the protic impurities present in the cyclic dichlorophosphazene with the boron trihalide. The reaction time is dependent upon factors such as the degree of agitation, temperature and pressure. In general, the reaction time may range from 1 to 4 hours but often 1 to 2 hours are sufficient.

Following the treatment of the cyclic oligomer with the boron trihalide, the reactor is purged with an inert gas, preferably the same gas used to pressurize the reactor, to remove the products formed from the reaction of protic impurities with boron trihalide as well as any excess boron trihalide, thereby producing a cyclic dichlorophosphazene oligomer which is substantially free of protic impurities.

The purging procedure can be conducted by simply passing the inert gas, e.g., nitrogen, over the head space above the molten trimer and out one of the ports. An alternative and often preferred purging procedure involves sparging dry nitrogen into the bottom of the reactor so as to physically displace any dissolved HCl or excess $BCl_3$ from the molten trimer and then passing the gas out of the ports. In either case, the purging procedure is repeated until the exiting gas does not contain any HCl or $BCl_3$. This can readily be determined by passing the exiting gas into a chloroform solution of dianisylidene acetone. If the exiting gas contains $BCl_3$, the solution turns red whereas if it does not the solution will be either pale yellow or colorless.

The process of this invention is conducted prior to polymerization of the cyclic dichlorophosphazene oligomers. Accordingly, the purification process can be performed in a separate reactor if desired and the purified oligomer can then be subsequently catalytically polymerized in conventional polymerization equipment. However, it is preferred both from an efficiency standpoint and to prevent possible contamination by protic impurities during handling to conduct the purification process in the polymerization reactor as a pretreatment just prior to polymerization.

As mentioned above, during the purification process, the boron trihalide reacts with the protic impurities present in the cyclic dichlorophosphazene oligomer. This reaction is believed to proceed by a hydrolysis mechanism in which the boron trihalide is hydrolyzed by the protic impurities. Thus, the hydrolysis of boron trichloride by water and alcohols is well known as described in the Articles "Friedel-Crafts and Related Reactions," Volume I, pages 480–481 by G. O. Olak published by Interscience Publishers in 1963 and "Organoboron Chemistry" Volume I, page 541 by H. Steinberg, published by Interscience Publishers in 1964.

The hydrolysis reaction with water proceeds as follows:

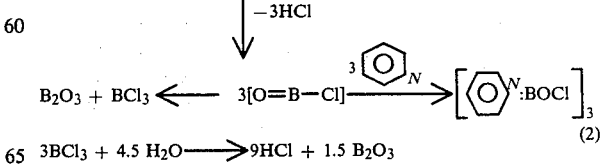

The importance of the purification process of this invention can best be appreciated by a general consideration of the catalytic polymerization of cyclic dichlorophosphazene oligomers containing protic impurities to linear higher molecular weight polydichlorophosphazene polymers, particularly when the catalyst utilized is a boron trihalide as illustrated by U.S. Pat. No. 4,116,891 or a catalyst complex of a boron trihalide-oxygenated phosphorus compound as illustrated by our copending application Ser. No. 077,245 filed Sept. 19, 1979, now U.S. Pat. No. 4,226,840 commonly assigned to applicant's assignee herein; the disclosures of which are incorporated herein by reference.

It should first be noted that in the catalytic polymerization of cyclic dichlorophosphazene oligomers to linear polydichlorophosphazene polymer, it is generally known that the use of small amounts of catalyst results in the production of relatively high molecular weight polydichlorophosphazene polymer whereas the use of large amounts of catalyst results in the production of relatively low molecular weight polydichlorophosphazene polymer. Bearing this in mind, it will become evident that if ingredients are present during polymerization which attack or otherwise react with the catalyst, the rate of polymerization and properties of the finished polymer such as molecular weight and viscosity may not reach expected levels.

Thus, if a cyclic dichlorophosphazene oligomer containing protic impurities is polymerized with a boron trihalide catalyst, the protic impurities such as water will react with the catalyst as shown in the above equations thereby reducing the effective amount of catalyst available for polymerization activity. This may not create a severe problem in cases where large amounts of catalyst are employed. However, in instances where it is desired to produce a high molecular weight polymer by using small amounts of catalyst a significant problem could occur in cases where the starting cyclic dichlorophosphazene oligomer contains a large amount of protic impurities. In such instances, we have found that the amount of protic impurities present in the oligomer may be sufficient to completely destroy or almost destroy the catalyst (see the Examples).

The most surprising and unexpected aspect of the process of the invention is that the boric anhydride by product produced by the reaction of boron trihalide and protic impurities such as water does not adversely affect the polymerization of the cyclic oligomer if the hydrogen chloride by product and excess boron trichloride are removed from the reaction zone.

The following Examples are submitted for the purpose of further illustrating the nature of the invention and are not intended as a limitation of the scope thereof. Parts and percentages shown in the Examples are by weight unless otherwise indicated.

The following Examples (A-F) illustrate the effects of polymerizing cyclic dichlorophosphazene trimer $(NPCl_2)_3$ containing trace amounts of water and other protic impurities in the presence of a boron trichloride-triphenyl phosphate catalyst complex.

EXAMPLES A-E

In these Examples, samples of different commercial lots of cyclic trimer $(NPCl_2)_3$ were first analyzed by the Karl Fischer water analysis method to determine the amounts of water present therein. These samples were then polymerized using various levels of a boron trichloride-triphenyl phosphate complex prepared in accordance with the procedure described in our aforementioned copending application Ser. No. 077,245.

The general polymerization procedure involves charging the trimer and catalyst complex to a 316 stainless steel reactor equipped with thermometer, pressure gauges, ports and mechanical anchor stirrer. The reactor is then heated externally to 220° for 18-48 hours. Percentage conversion is obtained by vacuum sublimation of a small portion of the polymerizate. A second small portion of the polymerizate is dissolved in a solvent, reprecipitated with a non-solvent, dried, and dissolved in a solvent for determination of intrinsic viscosity [n] which is directly proportional to the molecular weight of the polydichlorophosphazene polymer.

Table I below shows the results of the Karl Fischer analysis for amounts of water in the various samples of trimer, the amounts of boron trichloride-triphenyl phosphate catalyst employed and the theoretical amount of catalyst destroyed by water. Table II below shows the polymerization conditions including weight percentages of trimer and catalyst, temperatures and times and polymerization results such as percentage conversion and intrinsic viscosity.

TABLE I

| Ex. | $H_2O$ in Trimer PPM[1] | $H_2O$ in Trimer mm[2] | Catalyst Added[3] mm | Catalyst Destroyed[4] By $H_2O$ mm |
|-----|-----|-----|-----|-----|
| A | 19 | 2.9 | 37.0 | 1.9 |
| B | 19 | 2.9 | 10.4 | 1.9 |
| C | 78 | 12.0 | 12.2 | 8.0 |
| D | 78 | 10.3 | 10.4 | 6.9 |
| E | 56 | 8.5 | 6.2 | 5.7 |
| F | 70 | 13.2 | 6.4 | 8.8 |

[1] PPM = parts per million
[2] mm = millimoles
[3] $CL_3B \longrightarrow O = P(O\phi)_3$, $\phi$ = phenyl
[4] as determined from the reaction:

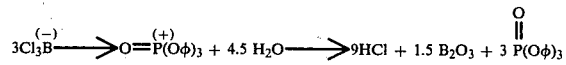

TABLE II

| Ex. | Trimer grams | Catalyst Grams | Catalyst Weight % | Temp. °C. | Time hrs. | % Conversion | % Conv. per hr. | Intrinsic Viscosity |
|-----|-----|-----|-----|-----|-----|-----|-----|-----|
| A | 2724 | 16.4 | 0.60 | 220 | 48 | 88 | 1.83 | 0.30 |
| B | 2724 | 4.6 | 0.17 | 220 | 24 | 63 | 2.63 | 0.80 |
| C | 3178 | 5.4 | 0.17 | 220 | 22.5 | 28 | 1.24 | 0.60 |
| D | 2724 | 4.6 | 0.17 | 220 | 22 | 33 | 1.50 | 0.55 |
| E | 2724 | 2.75 | 0.101 | 220 | 18 | 6 | 0.33 | 0.48 |
| F | 3405 | 2.84 | 0.083 | 220 | 20.5 | 4 | 0.20 | 0.42 |

The data in Table I and II clearly illustrates the adverse effects of trace amounts of protic impurities present in the trimer on the boron trihalide catalyzed polymerization of the trimer. In Examples A through F above, no boron trihalide was utilized to pretreat the trimer to remove protic impurities such as water prior to polymerization. The effects of water on the catalytic polymerization are significant.

In Example A, a relatively large amount of catalyst, i.e., 37 mm is utilized in order to effect polymerization.

In such case, one would expect to obtain rapid polymerization and high percentage of conversion as well as a polymerizate exhibiting a low molecular weight and intrinsic viscosity. As shown in Table II, these results are obtained. However, as shown in Table I, the starting trimer contains a very small amount of water, i.e., 2.9 mm. Accordingly, 1.9 mm of the catalyst would be destroyed by hydrolysis. Thus, while the polymerization results are not severely affected, the final values, e.g., polymerization rate, percent conversion, molecular weight viscosity, etc. would not reach expected levels.

Example B which utilizes the same trimer shows somewhat similar results. In this case, a low catalyst level is used which would be expected to result in a polymerizate having higher molecular weight and viscosity values than that of Example A. Again, while the overall results are in the expected direction, the presence of water in the trimer results in the destruction of 1.9 mm of catalyst thereby leading to a situation in which the polymerization properties do not reach the expected levels. It should be noted here that in Examples A and B the levels of water in the starting trimers are very low leading to the destruction of only small amounts of catalyst and therefore drastic effects on the polymerization properties are not obtained.

However, the same situation does not prevail in Examples C-F where the starting trimer contains considerably higher levels of water and the amounts of catalyst employed are relatively low. Thus, in Example C, 12.2 mm of catalyst were added. This translates to a weight % of 0.17, the same as used in Example B. Normally, one would therefore expect the molecular weight or viscosity of the polymerizate to be the same as that obtained in Example B. However, the molar quantity of water present in the trimer is much higher than in Example B, i.e., 12.0 mm. As shown in Table I, the amount of catalyst destroyed is 8.0 mm leaving an effective catalyst amount of 4.2 mm. This results in a lowering of the percentage conversion, conversion rate and decrease in the expected molecular weight. Example D shows similar results to that of Example C.

Examples E and F illustrate the even more deleterious effects when the trimer contains high levels of water and low quantities of catalyst are employed. Thus, in Example E, an attempt was made to polymerize a trimer containing 8.5 mm of water with 6.2 mm of added catalyst. As shown in Table I, the amount of water in the trimer results in the destruction of 5.7 mm of catalyst leaving only 0.5 mm of effective catalyst. The resulting polymerization results show a very low percentage conversion, conversion rate and low intrinsic viscosity and hence low molecular weight. Based on the original amount of catalyst added, i.e., 6.2 mm, one would have expected a high intrinsic viscosity. Example F shows even more drastic effects. Thus in Example F, an attempt was made to polymerize a trimer containing 13.2 mm of water with 6.4 mm of catalyst. As shown in Table I, this amount of water theoretically will result in the destruction of 8.8 mm of catalyst, more than was actually added. As shown in Table II, the percentage conversion and conversion rate are extremely low and the intrinsic viscosity or molecular weight is also low. Based on the original amount of catalyst charged in Example F, one would have expected a high intrinsic viscosity or molecular weight.

The following Examples (1-3) illustrate the purification of cyclic dichlorophosphazene trimer by pretreatment with boron trichloride in accordance with the process of the invention and the effect of the pretreatment on the subsequent boron trichloride-triphenyl phosphate catalyst polymerization of the purified trimer.

EXAMPLES 1-3

In these Examples, three samples of trimer were first analyzed for amounts of water. The trimer was then purified to remove water and other protic impurities by treatment with boron trichloride using the following general procedure:

Into a 316 stainless steel reactor equipped with thermometer, pressure gauges, ports and a mechanical anchor stirrer was charged the trimer. The reactor was then heated to a temperature between 115° C. and 150° C. in order to melt the trimer. Then, gaseous boron trichloride in an amount in excess of the amount of water found in the analysis of the trimer was added to the reactor with the temperature of the reactor being held below 150° C. Following this addition, the reactor was pressurized with nitrogen to an internal pressure of 50 psig. The trimer and boron trichloride were then stirred for from 1 to 2 hours to provide sufficient time for any protic impurities such as water to react with the boron trichloride. Following this step, the reactor was purged with nitrogen gas by passing the gas over the head space above the molten trimer and out one of the ports while stirring was continued in order to remove the hydrogen chloride gas by product and the excess boron trichloride.

In order to determine the effect of this purification pretreatment on catalytic polymerization, the purified trimer was polymerized with a boron trichloride-triphenyl phosphate catalyst complex immediately following the purging procedure. This was accomplished by adding the desired level of catalyst to the reactor and then raising the temperature to 220° C. The amounts of catalyst, polymerization temperature and time being selected so as to achieve the percent conversion, conversion rate and polymerizate properties (e.g., intrinsic viscosity) desired.

Table III below shows the results of the analysis of trimer samples for water and the amounts of boron trichloride utilized in the treatment of the trimer samples. In addition, for comparative purposes, Table III also includes the amounts of boron trichloride-triphenyl catalyst employed in the subsequent polymerization and the theoretical amounts of such catalyst which would have been destroyed in the absence of the boron trichloride purification pretreatment. Table IV below shows the results of polymerizing the purified trimer with the boron trichloride-triphenyl catalyst phosphate complex.

TABLE III

| Ex. | $H_2O$ in Trimer ppm | $H_2O$ in Trimer mm | $BCl_3$ Treatment grams | $BCl_3$ Treatment mm | Catalyst Added mm | Theor. Catalyst Destroyed* mm |
|---|---|---|---|---|---|---|
| 1 | 59 | 9.0 | 7 | 60 | 10.4 | 6.0 |
| 2 | 59 | 10.0 | 5 | 43 | 5.8 | 6.7 |
| 3 | 150 | 25.4 | 4 | 34 | 6.5 | 16.9 |

*Theoretical amount of catalyst which would have been destroyed in the absence of the boron trichloride pretreatment.

TABLE IV

| Ex. | Trimer grams | Catalyst Grams | Catalyst Wt. % | Polymerization Temp. °C. | Polymerization Time | % Conv. | % Conv. per hr. | Intrinsic Viscosity |
|---|---|---|---|---|---|---|---|---|
| 1 | 2724 | 4.60 | 0.170 | 220 | 22 | 61 | 2.8 | 0.70 |
| 2 | 3042 | 2.57 | 0.084 | 220 | 20 | 59 | 3.0 | 1.60 |
| 3 | 3042 | 2.90 | 0.095 | 220 | 14 | 41 | 2.9 | 1.50 |

A comparison of the polymerization results obtained in Examples 1–3 with the polymerization results obtained in Examples D–F clearly illustrates the advantages obtained by utilizing the boron trihalide pretreatment process of the invention.

Thus, in the absence of the boron trichloride pretreatment, one which would expect the percent conversion, conversion rate and intrinsic viscosity of Example 1 to approximate those of Example D (i.e., 33%, 1.5% per hour, 0.55) based upon the similar millimolar quantities of water in the starting trimers, the same amount of added catalyst and the similar amount of catalyst which would have been destroyed by the water in the trimer. However, the boron trichloride pretreatment process was employed in Example 1 and, as shown in Table IV, a percent conversion of 61%, a conversion rate of 2.8% per hour and an intrinsic viscosity of 0.70 were obtained.

A comparison of the polymerization results obtained in Examples 2 and 3 with those obtained in Examples E and F shows even more dramatic results. Thus, in the absence of the boron trichloride pretreatment, one would expect the percent conversion, conversion rates and intrinsic viscosities of Examples 2 and 3 to approximate those obtained in Examples E (i.e., 6%, 0.33% per hour, 0.48) and F (i.e., 4%, 0.20% per hour, 0.42). However, as a result of the boron trichloride pretreatment, Example 2 shows a percent conversion of 59.0%, a % conversion per hour of 3.0% and an intrinsic viscosity of 1.60, while Example 3 shows a percent conversion of 41.0%, a % conversion per hour of 2.9% and an intrinsic viscosity of 1.50.

What is claimed is:

1. A method of purifying a cyclic dichlorophosphazene containing trace amounts of protic impurities which comprises the steps of:
    (a) heating said cyclic dichlorophosphazene in a reactor to a temperature of from 115° C. to 150° C.;
    (b) adding a gaseous or liquid boron trihalide to the reactor in an amount in excess of the amount of protic impurities present in the cyclic dichlorophosphazene, while maintaining the temperature of the reactor below 150° C.;
    (c) pressurizing said reactor with an inert gas to an internal pressure which is sufficient to permit intimate contact between the cyclic dichlorophosphazene and the boron trihalide;
    (d) agitating the contents of the reactor for a sufficient time to permit reaction of substantially all of the protic impurities in the cyclic dichlorophosphazene with the boron trihalide; and
    (e) purging said reactor with said inert gas to remove the products formed from the reaction of said protic impurities and said boron trihalide and excess boron trihalide, thereby producing a cyclic dichlorophosphazene which is substantially free of protic impurities.

2. The method of claim 1 wherein said cyclic dichlorophosphazene is represented by the formula $(NPCl_2)_n$ in which n is from 3 to 9.

3. The method of claim 1 wherein said cyclic dichlorophosphazene is the cyclic trimer $(NPCl_2)_3$.

4. The method of claim 1 wherein said boron trihalide is gaseous boron trihalide.

5. The method of claim 1 wherein said boron trihalide is $BCl_3$.

6. The method of claim 1 wherein said inert gas is nitrogen.

7. The method of claim 1 wherein said internal pressure is from about 50 psig to about 300 psig.

8. The method of claim 1 wherein said internal pressure is 50 psig.

9. The method of claim 1 wherein the agitation time is from 1 to 2 hours.

10. In a method of preparing a high molecular weight linear polydichlorophosphazene polymer which involves thermally polymerizing a cyclic dichlorophosphazene represented by the formula $(NPCl_2)_n$ in which n is from 3 to 9, in the presence of a polymerization catalyst comprising a boron trihalide or a boron trihalide-oxygenated phosphorus compound complex; the improvement which comprises purifying the cyclic dichlorophosphazene with a gaseous or liquid boron trihalide to remove trace amounts of protic impurities from the cyclic dichlorophosphazene prior to initiating the polymerization wherein the cyclic dichlorophosphazene is purified by a method which comprises the steps of:
    (a) heating said cyclic dichlorophosphazene in a reactor to a temperature of from 115° C. to 150° C.;
    (b) adding a gaseous or liquid boron trihalide to the reactor in an amount in excess of the amount of protic impurities present in the cyclic dichlorophosphazene while maintaining the temperature of the reactor below 150° C.;
    (c) pressurizing said reactor with an inert gas to an internal pressure which is sufficient to permit intimate contact between the cyclic dichlorophosphazene and the boron trihalide;
    (d) agitating the contents of the reactor for a sufficient time to permit reaction of substantially all of the protic impurities in the cyclic dichlorophosphazene with the boron trihalide; and
    (e) purging said reactor with said inert gas to remove the products formed from the reaction of said protic impurities and said boron trihalide and excess boron trihalide, thereby producing a cyclic dichlorophosphazene which is substantially free of protic impurities.

11. The method of claim 10 wherein said polymerization catalyst is a boron trichloride-triphenyl phosphate complex.

12. The method of claim 10 wherein said cyclic dichlorophosphazene is $(NPCl_2)_3$.

13. The method of claim 10 wherein said boron trihalide is gaseous boron trihalide.

14. The method of claim 10 wherein said boron trihalide is $BCl_3$.

15. The method of claim 10 wherein said inert gas is nitrogen.

16. The method of claim 10 wherein said internal pressure is from about 50 psig to about 300 psig.

17. The method of claim 10 wherein said internal pressure is 50 psig.

* * * * *

UNITED STATES PATENT AND TRADEMARK OFFICE
CERTIFICATE OF CORRECTION

PATENT NO. : 4,327,063
DATED : April 27, 1982
INVENTOR(S) : John W. Fieldhouse and Daniel F. Graves It is certified that error appears in the above-identified patent and that said Letters Patent are hereby corrected as shown below:

Column 3, line 5

"basis" should read -- basic --

Signed and Sealed this

Twenty-ninth Day of June 1982

[SEAL]

Attest:

GERALD J. MOSSINGHOFF

*Attesting Officer*     *Commissioner of Patents and Trademarks*